United States Patent
Jung et al.

(10) Patent No.: US 12,237,530 B2
(45) Date of Patent: Feb. 25, 2025

(54) DEGASSING APPARATUS AND DEGASSING METHOD

(71) Applicant: LG Energy Solution, Ltd., Seoul (KR)

(72) Inventors: Kyu Sung Jung, Daejeon (KR); Jun Hyeak Huh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 164 days.

(21) Appl. No.: 17/916,866

(22) PCT Filed: May 7, 2021

(86) PCT No.: PCT/KR2021/005718
§ 371 (c)(1),
(2) Date: Oct. 4, 2022

(87) PCT Pub. No.: WO2021/225398
PCT Pub. Date: Nov. 11, 2021

(65) Prior Publication Data
US 2023/0163403 A1 May 25, 2023

(30) Foreign Application Priority Data
May 7, 2020 (KR) .................. 10-2020-0054784

(51) Int. Cl.
*H01M 10/00* (2006.01)
*B29C 67/00* (2017.01)
(Continued)

(52) U.S. Cl.
CPC ......... *H01M 50/30* (2021.01); *B29C 67/0044* (2013.01); *H01M 10/0404* (2013.01);
(Continued)

(58) Field of Classification Search
CPC ............. H01M 10/0481; H01M 10/52; H01M 10/6572; H01M 50/30–394; B29C 43/56; B29C 2043/561–568
See application file for complete search history.

(56) References Cited

U.S. PATENT DOCUMENTS 6,255,015 B1 * 7/2001 Corrigan ............. H01M 10/625
429/163
6,689,510 B1 2/2004 Gow et al.
(Continued)

FOREIGN PATENT DOCUMENTS

CN 1324499 A 11/2001
CN 205376668 U 7/2016
(Continued)

OTHER PUBLICATIONS

Search Report dated Aug. 20, 23 from the Office Action for Chinese Application No. 202180027753.X issued Aug. 23, 23, pp. 1-3. [See pp. 1-2, categorizing the cited references].
(Continued)

*Primary Examiner* — Atul P. Khare
(74) *Attorney, Agent, or Firm* — Lerner David LLP

(57) ABSTRACT

Disclose herein is a degassing apparatus for a pouch including a body part. The degassing apparatus can include a lower mold placed on a bottom surface of the body part, an upper mold configured to press a top surface of the body part placed on the lower mold, and a cooling member. At least one of the lower mold or the upper mold is cooled by the cooling member to cool an electrolyte injected into the body part when the body part contacts the lower or upper molds. A method for degassing a pouch can include seating a body part of the pouch on a lower mold, pressing the pouch with an upper mold, cooling a body part to lower the temperature of an electrolyte in an electrode assembly of the pouch, and
(Continued)

suctioning a gas by inserting a gas inhaler into a gas pocket part.

15 Claims, 5 Drawing Sheets

(51) Int. Cl.
*H01M 10/04* (2006.01)
*H01M 10/613* (2014.01)
*H01M 10/6572* (2014.01)
*H01M 50/30* (2021.01)
*H01M 50/609* (2021.01)
*B29C 43/52* (2006.01)
*B29C 43/56* (2006.01)
*H01M 50/105* (2021.01)

(52) U.S. Cl.
CPC ..... *H01M 10/0481* (2013.01); *H01M 10/613* (2015.04); *H01M 10/6572* (2015.04); *H01M 50/609* (2021.01); *B29C 2043/527* (2013.01); *B29C 2043/563* (2013.01); *H01M 50/105* (2021.01); *Y02E 60/10* (2013.01)

(56) References Cited

U.S. PATENT DOCUMENTS

| | | |
|---|---|---|
| 2003/0049527 A1 | 3/2003 | Yageta et al. |
| 2003/0232239 A1 | 12/2003 | Gow et al. |
| 2004/0086779 A1 | 5/2004 | Higley et al. |
| 2006/0257732 A1 | 11/2006 | Yageta et al. |
| 2013/0244093 A1 | 9/2013 | Min et al. |
| 2014/0352140 A1 | 12/2014 | Tasaki et al. |
| 2016/0380302 A1 | 12/2016 | Yun |
| 2023/0373138 A1* | 11/2023 | Min .................. B29C 43/021 |
| 2024/0030481 A1* | 1/2024 | Kim .................. B29C 66/81435 |

FOREIGN PATENT DOCUMENTS

| | | | |
|---|---|---|---|
| CN | 107403945 A | 11/2017 | |
| CN | 109411825 A | 3/2019 | |
| CN | 110970666 A | 4/2020 | |
| JP | 4720065 B2 | 7/2011 | |
| JP | 2013125675 A | 6/2013 | |
| JP | 2013149521 A | 8/2013 | |
| JP | 2014502024 A | 1/2014 | |
| JP | 2014086265 A | 5/2014 | |
| JP | 2015109223 A | 6/2015 | |
| JP | 2016162708 A | 9/2016 | |
| JP | 2016162991 A | 9/2016 | |
| JP | 6183540 B2 | 8/2017 | |
| KR | 100709865 B1 | 4/2007 | |
| KR | 20120060707 A | 6/2012 | |
| KR | 101163000 B1 | 7/2012 | |
| KR | 20170001358 A | 1/2017 | |
| KR | 20170087250 A | 7/2017 | |
| KR | 20170104205 A | 9/2017 | |
| KR | 101791535 B1 | 11/2017 | |
| KR | 20180044100 A | 5/2018 | |
| KR | 20190055585 A | 5/2019 | |
| KR | 102028082 B1 | 11/2019 | |
| WO | WO-2015145551 A1 * | 10/2015 | ........ H01M 10/0404 |
| WO | 2016021066 A1 | 2/2016 | |
| WO | WO-2021194292 A1 * | 9/2021 | ........... F16K 31/004 |

OTHER PUBLICATIONS

International Search Report for Application No. PCT/KR2021/005718 mailed Aug. 17, 2021, 2 pages.

Search Report dated May 20, 2024 from the Office Action for Chinese Application No. 202180027753.X issued May 24, 2024, 2 pages.

Extended European Search Report including Written Opinion for Application No. 21800591.6 dated Jun. 11, 2024, pp. 1-10.

* cited by examiner

[PRIOR ART]

DEGASSING APPARATUS AND DEGASSING METHOD

CROSS-REFERENCE TO RELATED APPLICATIONS

The present application is a national phase entry under 35 U.S.C. § 371 of International Application No. PCT/KR2021/005718 filed on May 7, 2021, which claims the benefit of the priority of Korean Patent Application No. 10-2020-0054784, filed on May 7, 2020, both of which are hereby incorporated by reference in their entirety.

TECHNICAL FIELD

The present invention relates to a degassing apparatus, which discharges a gas generated therein while an activation process is performed after an electrode assembly and an electrolyte are inserted into a pouch, and a degassing method, and more particularly, to a degassing apparatus, in which at least one more of a lower mold and an upper mold, which press a pouch, are cooled to increase in viscosity of an electrolyte, thereby solving a problem, in which the electrolyte is discharged together when a gas is discharged, and a degassing method.

BACKGROUND ART

Recently, with the rapid development of the electric, electronic, telecommunication and computer industries, the demand for high performance and high safety batteries is gradually increasing. Particularly, as electronic devices are becoming more compact, thinner and lighter, the demands for miniaturization and thinning of batteries is gradually increasing. In response to these demands, a lithium secondary battery with a high energy density is drawing the most attention.

Lithium batteries have advantages of long lifespan and large capacity and are widely used in portable electronic devices. The lithium batteries comprise lithium metal batteries and lithium ion batteries, which use a liquid electrolyte, and lithium polymer batteries using a polymer solid battery depending on types of electrolytes.

In addition, lithium secondary batteries are classified into a prismatic battery using a prismatic can, a cylindrical battery using a cylindrical can, and a pouch-type battery using a pouch according to types of exteriors that seal an electrode assembly.

Among them, the pouch-type battery has advantages such as higher energy density per unit weight and volume, enables thinner and lighter battery, as well as a lower material cost as an exterior, and thus has been actively developed in recent years.

In addition, a method for manufacturing a pouch-type battery using the liquid electrolyte is as follows. First, a positive electrode and a negative electrode are manufactured, and then, a separator is disposed between the positive electrode and the negative electrode, and the positive electrode, the separator, and the negative electrode are stacked to manufacture an electrode assembly. Then, the electrode assembly is inserted together with the electrolyte into the inside of the pouch.

Here, as illustrated in FIG. 1, which simply shows a schematic shape of the degassing apparatus according to the related art, a pouch 1 is provided with a body part 1a, in which an electrode assembly and an electrolyte are embedded, and a gas pocket part 1b, which is expanded to one side from the body part 1a and of which the inside is opened to allow a gas to enter and exit. The gas pocket part 1b may be a portion at which a gas is collected during the degassing process, i.e., a portion, which is cut and removed when the degassing is completed. Heat and a pressure are applied to the cut portions of the gas pocket part 1b and the body part 1a to seal the cut portions.

After the electrode assembly is embedded first in the pouch 1, the electrolyte is injected into the pouch 1 to impregnate the electrode assembly into the electrolyte. When the electrolyte is injected as described above, an edge of an opening, into which the electrode assembly is inserted, is fused to be bonded, thereby sealing the pouch 1.

Also, after an aging process is performed for stabilization, a charging/discharging process is performed to activate the battery. During the charging/discharging process, since a gas is generated inside the pouch 1, degassing is performed to discharge the gas generated therein. After the degassing process is performed, the gas pocket part 1b is cut and discarded, and the cut portions of the gas pocket part 1b and the body part 1a are sealed to manufacture a secondary battery.

As illustrated in FIG. 1, in the degassing process, the body part 1a of the pouch 1 is seated on a lower mold 2, and then, an upper mold 3 descends onto the body part 1a to press the body part 1a. Here, a negative pressure is applied to the gas pocket part 1b after an end of a gas inhaler 4 is inserted into the gas pocket part 1b to suction the gas. Here, the gas existing in the body part 1a is pushed into the gas pocket part 1b by the pressure applied to the upper mold 3, and thus, the gas moving through the gas inhaler 4 is discharged from the gas pocket part 1b to the outside.

However, in the above-described degassing method, a portion of the electrolyte is discharged together with the gas according to the amount and viscosity of the electrolyte injected at the beginning, the descending pressure and descending speed of the upper mold 3, the suction force of the gas inhaler 4, and the like.

Also, when the amount of electrolyte within the body part 1a decreases below a certain level due to an increase in discharge amount of electrolyte increases due to the discharge of the gas, the lifespan of the secondary battery may be deteriorated, and also, when the discharge amount of gas is too small, the gas remaining in the body part 1a may cause swelling.

DISCLOSURE OF THE INVENTION

Technical Problem

Accordingly, an object of the present invention is to provide a degassing apparatus and a degassing method, which are capable of blocking or minimizing a discharge of an electrolyte during a degassing process.

Technical Solution

The present invention for achieving the above object provides a degassing method and a degassing apparatus that is capable of performing the degassing method.

A degassing method for a pouch that comprises a body part, on which an electrode assembly is mounted, and into which an electrolyte is injected, and a gas pocket part extending from the body part to one side, according to the present invention comprises: a pouch seating step (S10) of seating the body part on a lower mold; a pressing step (S30) of allowing an upper mold to descend so as to press the body part placed on the lower mold; and an inhalation step (S40) of suctioning a gas by inserting a gas inhaler into the gas pocket part, wherein, before starting the inhalation step (S40), a cooling step (S20) of cooling the body part is performed.

The cooling step (S20) may be started after the pouch seating step (S10) and before the pressing step (S30), and an end of the cooling step (S20) may be adjusted according to a change in cooling rate and viscosity of the electrolyte.

The inhalation step (S40) may be started simultaneously when the cooling step (S20) and the pressing step (S30) are performed. A negative pressure applied in the inhalation step (S40) may also be adjusted according to a change in viscosity of the electrolyte.

Thus, after the electrolyte is cooled to a temperature less than a predetermined temperature, the inhalation step (S40) may be started.

Also, in the cooling step (S20), a connection point between the body part and the gas pocket part may be more quickly cooled than other points. Here, in the cooling step (S20), the electrolyte may be cooled within a temperature range in which a change in physical property of the electrolyte does not occur.

In addition, the present invention may provide a degassing apparatus that is capable of performing the above-described degassing method. A degassing apparatus for a pouch that comprises a body part, on which an electrode assembly is mounted, and into which an electrolyte is injected, and a gas pocket part extending from the body part to one side, according to the present invention comprises: a lower mold placed on a bottom surface of the body part; and an upper mold descending to press a top surface of the body part placed on the lower mold, wherein at least one or more of the lower mold or the upper mold are cooled by a cooling member to cool the electrolyte injected into the body part when being in contact with the body part.

The degassing apparatus may further comprise a gas inhaler that is inserted into the gas pocket part to suction a gas when the lower mold and the upper mold press the body part.

The cooling member may comprise a Peltier element that is cooled when current is applied.

The Peltier element may be installed on the upper mold or the lower mold so that a surface of the upper mold or a surface of the lower mold, which is in contact with the body part, is more quickly cooled than other portions.

The Peltier element may be installed on the lower mold or installed on each of both the upper mold and the lower mold.

When the pouch is seated, the Peltier elements installed on the lower mold may be more densely installed at a boundary point between the body part and the gas pocket part than other points.

When a viscosity of the electrolyte before the cooling is 'X', the cooling device may be configured to cool the electrolyte until the viscosity of the electrolyte after the cooling becomes '1.5x' or more. For example, when a temperature of the electrolyte before the cooling is 20 degrees to 30 degrees, a temperature of the electrolyte after the cooling may be cooled to a temperature of 0 degree to 15 degrees by the cooling device. For example, if the viscosity is 4.37 Pa.s when a temperature of the electrolyte before the cooling is 25° C., the cooling may be performed up to a temperature at which the viscosity is 6.56 Pa·s or more.

The gas inhaler may suction a gas after the electrolyte is cooled to a predetermined reference temperature or more.

Advantageous Effects

In the present invention having the above configuration, since the cooling liquid is sufficiently cooled before the gas is suctioned to increase in viscosity, the movement of the gas to the gas pocket part may be suppressed as much as possible to prevent the electrolyte from being unnecessarily discharged.

In the present invention, since the cooling of the electrolyte is adjusted according to the change in cooling rate and viscosity of the electrolyte, the secondary batteries having various specifications may be applied.

In addition, in the present invention, the viscosity of the electrolyte at the specific point (particularly, the point that is close to the boundary with the gas pocket part) may further increase by cooling the specific point more rapidly, and thus, the amount and speed of the electrolyte moving to the gas pocket part may be delayed In addition, the degassing apparatus according to the present invention may comprise the Peltier element that is cooled when the current is applied so that the cooling of the electrolyte is performed relatively simply and quickly through the control of the current, and the cooling may be more efficiently controlled according to the viscosity of the electrolyte.

Particularly, according to the present invention, since the Peltier element is used as the cooling member to more quickly reduce the temperature of the specific part, the movement of the electrolyte may be delayed more quickly and efficiently at the portion that serves as the passage when the gas and the electrolyte flow.

MODE FOR CARRYING OUT THE INVENTION

Figure 1:
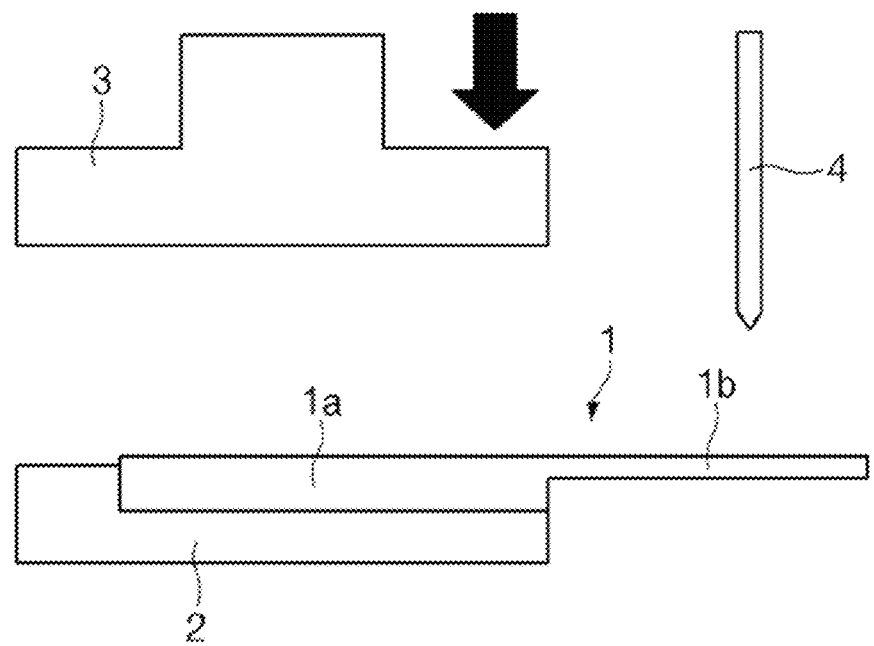
FIG. 1 is a schematic view illustrating a degassing apparatus according to prior art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention provides a degassing apparatus for removing a gas in a pouch and a degassing method that is capable of performing degassing using the degassing apparatus according to embodiments, respectively. Thus, hereinafter, the embodiments of the present invention will be described in more detail with reference to the accompanying drawings.

First Embodiment

The present invention provides a degassing method for removing a gas in a pouch as a first embodiment.

Figure 2:
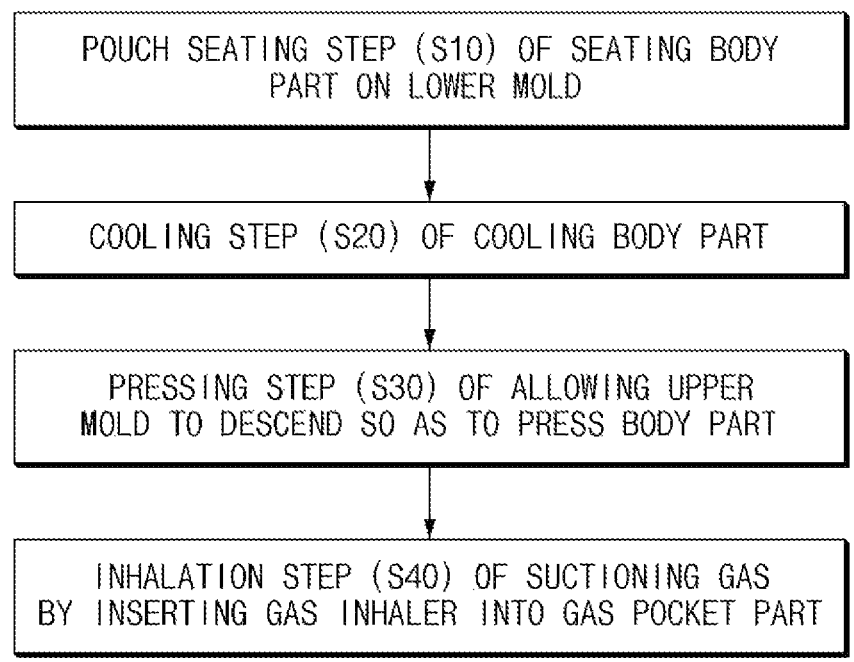
FIG. 2 is a flowchart illustrating a degassing method according to the present invention.

Referring to FIG. 2 illustrating a flowchart of the degassing method according to the present invention, the degassing method according to the present invention relates to a method for degassing a pouch 10 comprising a body part 10a, on which an electrode assembly is mounted, and into which an electrolyte is injected, and a gas pocket part 10b extending from the body part 10a to one side and comprises a pouch seating step (S10), a cooling step (S20), a pressing step (S30), and an inhalation step (S40).

Figure 5:
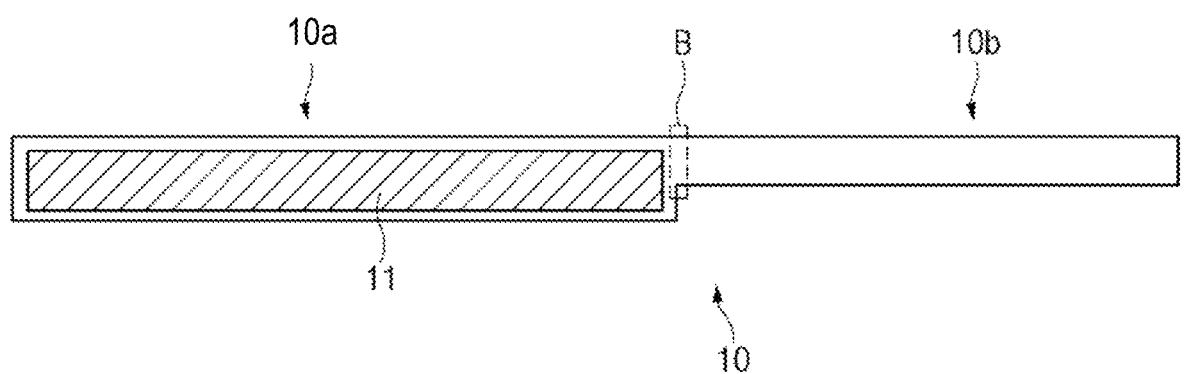
FIG. 5 is a cross-sectional view illustrating a state in which an electrode assembly is inserted into a pouch.

The pouch seating step (S10) is a step of seating the body part 10a on a lower mold 20. As illustrated in FIG. 5 that illustrates a state in which the electrode assembly 11 is inserted into the pouch 10, the pouch 10 to be seated on the lower mold 20 is seated after the electrolyte and the electrode assembly 11 are embedded in the body part 10a, and then, an aging process and an activation process are completely performed.

After the pouch seating step (S10), the pressing step (S30) is performed, and the cooling step (S20) is performed before the pressing step (S30) or during the pressing step (S30). That is, a start time of the cooling step (S20) may be different depending on whether a cooling member 50 is installed on the lower mold 20 or an upper mold 30.

In the cooling step (S20), the cooling member 50 installed (or connected to be heat-exchanged) on at least one of the lower mold 20 or the upper mold 30 or both the lower mold 20 and the upper mold 30 is configured to cool the body part 10a of the pouch 10. In the pressing step (S30), the upper mold 30 descends to press the body part 10a placed on the lower mold 20 at a predetermined pressure.

Here, if the cooling member 50 is mounted on or connected to the upper mold 30 before the body part 10a is cooled to a predetermined temperature, in the pressing step (S30), a contact step, in which a contact state is maintained for a certain time without a substantial pressure causing movement of a gas may be selectively performed so that a pressure is not applied to the body part 10a, but only heat exchange for the cooling is performed. Also, when the body part 10a is cooled to a predetermined temperature, the contact step may be released, and an appropriate pressure may be applied to cause the movement of the gas in the body part 10a.

After the pressing step (S30), the inhalation step (S40) is performed, and the cooling step (S20), in which the body part 10a is cooled to increase in viscosity of the electrolyte, may be performed before or after the pressing step (S30) before the inhalation step (S40).

In the inhalation step (S40), an end of the gas inhaler 40 is inserted into the gas pocket part 10b of the pouch 10 to apply a certain negative pressure, thereby suctioning the gas. Here, the gas in the body part 10a is in a state of moving to the gas pocket part 10b through the pressing step (S30), and the movement of the electrolyte of which the viscosity increases through the cooling step (S20) is suppressed in the pressing step (S30), and thus, an amount of electrolyte moving to the gas inhaler 40 is minimized. Therefore, the inhalation step (S40) is started after cooling the electrolyte so that the viscosity of the electrolyte sufficiently increases.

As described above, if before the inhalation step (S40), the cooling step (S20) is possible even after the pressing step (S30), but if the cooling member 50 is configured to be disposed on the lower mold 20, it is preferable that the cooling step (S20) is started after the pouch seating step (S10) and before the pressing step (S30) to increase in process rate.

Also, if the temperature of the electrolyte is sufficiently low in order to increase in process rate, or if instantaneous cooling is possible according to performance of the cooling member 50, the inhalation step (S40) may be started simultaneously when the cooling step (S20) and the pressing step (S30) are performed.

Also, the end of the cooling step (S20) may be adjusted according to the change in cooling rate and viscosity of the electrolyte, and the negative pressure acting in the inhalation step (S40) may be adjusted according to the change in viscosity of the electrolyte. However, in this embodiment, the inhalation step (S40) may be started after the electrolyte is cooled to a predetermined temperature or less, and it is preferable that, in the cooling step (S20), the electrolyte is cooled within a temperature range in which a change in physical property of the electrolyte does not occur.

Also, in the cooling step (S20), a connection point between the body part 10a and the gas pocket part 10b may be cooled faster than other points. That is, as illustrated in FIG. 5, a temperature at a point B, at which a boundary between the body part 10a and the gas pocket part 10b of the pouch 10 is disposed, is further lowered instantaneously to relatively further increase in viscosity of the electrolyte disposed at the point, thereby more efficiently decreasing in amount of electrolyte moving to the gas pocket part 10b.

Second Embodiment

The present invention provides a degassing apparatus for removing a gas in a pouch as a second embodiment.

Figure 3:
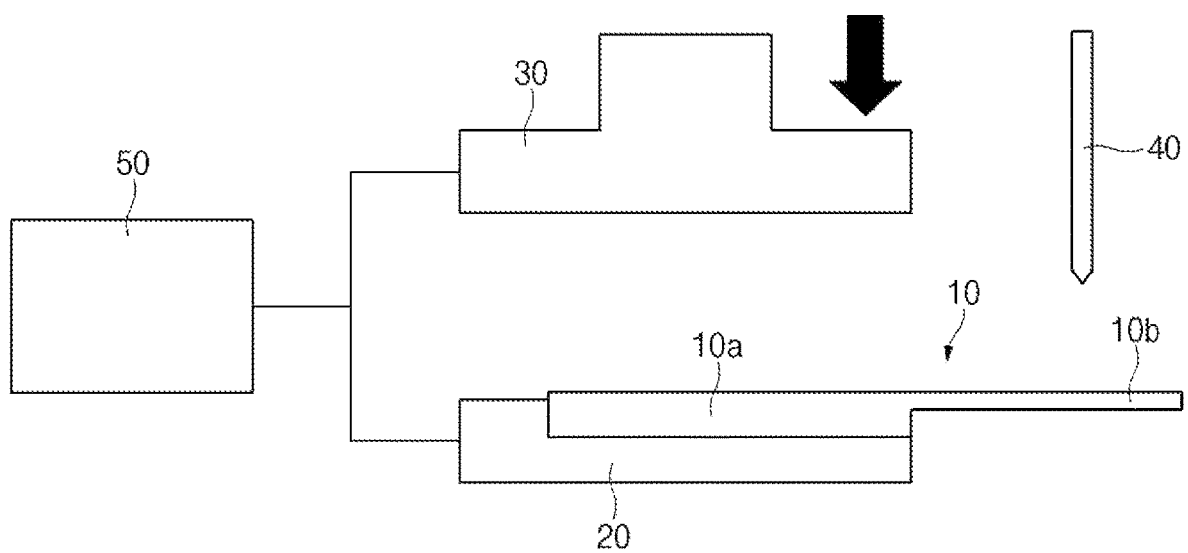
FIG. 3 is a schematic view illustrating a degassing apparatus according to the present invention.
Figure 4:
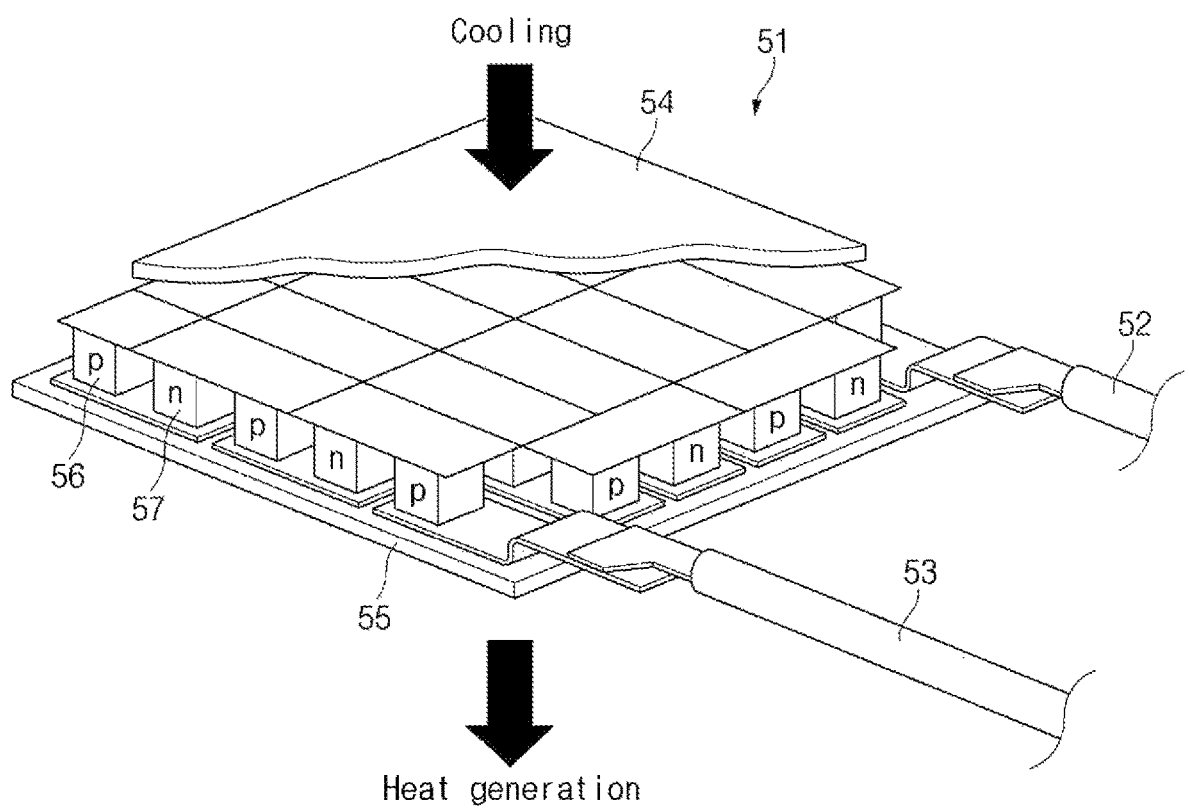
FIG. 4 is a perspective view illustrating a Peltier element in a degassing apparatus according to the present invention.

Referring to FIG. 3 that illustrates a simplified schematic view of the degassing apparatus according to the present invention and FIG. 4 that illustrates an internal configuration of a Peltier element 51 comprised in the degassing apparatus according to the present invention, the degassing apparatus according to the present invention additionally comprises a cooling device when compared to the degassing apparatus according to the related art.

That is, the degassing apparatus according to this embodiment is a degassing apparatus for a pouch 10 comprising a body part 10a, on which an electrode assembly 11 is mounted, and into which an electrolyte is injected, and a gas pocket part 10b extending from the body part 10a to one side. The degassing apparatus comprises a lower mold 20 placed on a bottom surface of the body part 10a and an upper mold 30 descending to press a top surface of the body part 10a placed on the lower mold 20. As illustrated in FIG. 3, at least one or more of the lower mold 20 or the upper mold 30 may be connected or coupled to a cooling member 50 so as to be heat-exchanged, or the cooling member is directly mounted on at least one or more of the lower mold 20 or the upper mold 30 to cool at least one or more of the lower mold 20 or the upper mold 30.

Thus, at least one or both of the upper mold 30 or the lower mold 20 cools the body part 10a when being in contact with the body part 10a to cool the electrolyte injected into the body part 10a, and the cooled electrolyte increases in viscosity in proportion to the decreasing temperature.

Furthermore, the degassing apparatus according to this embodiment further comprises a gas inhaler 40 that suctions a gas by inserting an end of the inhaler 40 into the gas pocket part 10b when the lower mold 20 and the upper mold 30 press the body part 10a.

The cooling member 50 is not particularly limited as long as the cooling member 50 is a device capable of rapidly performing the cooling, but in the present invention, the cooling member 50 comprises a Peltier element 51, in which the cooling is relatively easily controlled by adjusting an amount of current, and cooling performance is excellent, and particularly, instantaneous cooling is capable of being performed.

The Peltier element 51 may be configured to be cooled when the current is applied. That is, the Peltier element 51 is an element using a Peltier effect that generates a temperature difference by generating and absorbing heat at both sides at the same time when a potential difference occurs. The Peltier element 51 is configured to have a cooling effect by taking energy away from one metal in order that electrons move between two metals, in which the potential difference occurs. In the Peltier element 51 according to the present invention, a p-type semiconductor 56 and an n-type semiconductor 57 are disposed between two plates 54 and 55, and when current is applied to the p-type semiconductor 56 and the n-type semiconductor 57 through cables 52, 53, energy of one plate 54 is taken away to be cooled.

A plurality of Peltier elements 51 may be directly attached to the lower mold 20 or the upper mold 30 so as to be cooled or may be heat-exchanged with the lower mold 20 or the upper mold 30 through a refrigerant or the like so as to be cooled.

However, in order to improve the cooling efficiency, it is more preferable that a method in which the plate 54, in which the cooling is performed, of the Peltier element 51 is directly attached to the upper mold 30 or the lower mold 20.

Furthermore, the degassing apparatus according to this embodiment may be configured so that a specific portion of the body part 10a is cooled more rapidly. That is, the plurality of the Peltier elements 51 may be arranged at regular intervals on a surface of the upper mold 30 or a surface of the lower mold 20, which is in contact with the body part 10a. Here, the Peltier element having a larger output at a specific portion B may be disposed to more quickly cool the specific portion of the body part 10a than other portions, or the Peltier elements 51 are disposed more densely at the specific portion to more quickly cool the specific portion (for example, a portion 'B' in FIG. 5) of the body part 10a.

The Peltier element 51 may be installed only on any one of the lower mold 20 or the upper mold 30, but it is preferable to be installed on both the upper mold 30 and the lower mold 20 so as to perform the rapid cooling. Also, if the Peltier element 51 has to be installed on only one place, it is more preferable to be installed on the lower mold 20 having a relatively longer contact time with the body part 10a than to be installed on the upper mold 30.

In this embodiment, when the viscosity of the electrolyte before the cooling is 'X', the cooling member 50 may be configured to cool the electrolyte until the viscosity of the electrolyte after the cooling becomes '1.5×' or more.

For example, when a temperature of the electrolyte before the cooling is 20 degrees to 30 degrees, a temperature of the electrolyte after the cooling may be cooled to a temperature of 0 degree to 15 degrees by the cooling member 50. For example, if the viscosity is 4.37 Pa.s when a temperature of the electrolyte before the cooling is 25° C., the cooling may be performed up to a specific temperature at which the viscosity is 6.56 Pa·s or more.

For reference, the electrolyte may have a viscosity of 6.80 Pa·s at a temperature of 10° C. That is, when the electrolyte is cooled by a temperature of 15° C. (from 20° C. to 15° C.), the viscosity increases by approximately 56%. When the electrolyte is pressed, since the movement of the electrolyte solution having the increasing viscosity is reduced when compared to a case in which the temperature is relatively high. Thus, the movement of the electrolyte to the gas pocket part 10b of the pouch 10 may be prevented.

In the present invention, the gas inhaler 40 may suction a gas after the temperature of the electrolyte is cooled to a predetermined reference temperature or more, and the end of the gas inhaler 40 may be inserted into the gas pocket part 10b before cooling the electrolyte. However, it is preferable to be configured so that the end of the gas inhaler 40 is inserted after cooling the electrolyte as much as possible.

In the present invention having the above configuration, since the cooling liquid is sufficiently cooled before the gas is suctioned to increase in viscosity, the movement of the gas to the gas pocket part 10b may be suppressed as much as possible to prevent the electrolyte from being unnecessarily discharged.

In the present invention, since the cooling of the electrolyte is adjusted according to the change in cooling rate and viscosity of the electrolyte, the secondary batteries having various specifications may be applied.

In addition, in the present invention, the viscosity of the electrolyte at the specific point (particularly, the point that is close to the boundary with the gas pocket part 10b) may further increase by cooling the specific point more rapidly, and thus, the amount and speed of the electrolyte moving to the gas pocket part 10b may be delayed In addition, the degassing apparatus according to the present invention may comprise the Peltier element 51 that is cooled when the current is applied so that the cooling of the electrolyte is performed relatively simply and quickly through the control of the current, and the cooling may be more efficiently controlled according to the viscosity of the electrolyte.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Pouch (10a: body part, 10b: Gas pocket part)
20: Lower mold
30: Upper mold
40: Gas inhaler
50: Cooling device

The invention claimed is:

1. A degassing apparatus for a pouch, the degassing apparatus comprising:
   a mold including a lower mold and an upper mold, the upper mold configured to be positioned above the lower mold, the lower mold configured to contact a bottom surface of a body part of the pouch, and the upper mold configured to press a top surface of the body part when the lower mold contacts the bottom surface of the body part,
   a gas inhaler configured to be inserted into a gas pocket part of the pouch, and
   a cooling member, wherein at least one of the lower mold or the upper mold is cooled by the cooling member such that an electrolyte injected into the body part is cooled by the mold when the body part contacts the mold, and wherein the cooling member comprises a Peltier element configured to adjust the cooling according to a temperature and a viscosity of the electrolyte.

2. The degassing apparatus of claim 1, wherein the gas inhaler is configured to suction a gas from the gas pocket part when the lower mold and the upper mold contact the body part, the gas pocket part extending away from the body part.

3. The degassing apparatus of claim 2, wherein the Peltier element is cooled by an application of current thereto.

4. The degassing apparatus of claim 3, wherein the Peltier element is disposed on the upper mold or the lower mold such that a respective surface of the upper or lower mold with the Peltier element is more quickly cooled than other surfaces of the mold.

5. The degassing apparatus of claim 4, wherein the Peltier element is disposed on the lower mold or on each of the upper mold and the lower mold.

6. The degassing apparatus of claim 5, wherein an initial temperature of the electrolyte before the cooling is 20 degrees to 30 degrees, and a final temperature of the electrolyte after being cooled by the cooling member is 0 degree to 15 degrees.

7. The degassing apparatus of claim 5, wherein the gas inhaler is configured to suction the gas after the electrolyte is cooled to a predetermined reference temperature or less.

8. The degassing apparatus of claim 4, wherein the Peltier element comprises a plurality of Peltier elements disposed on the lower mold, and wherein when the pouch is placed between the upper and lower molds, the Peltier elements disposed on the lower mold are more densely distributed at a boundary between the body part and the gas pocket part than other regions of the lower mold or the upper mold.

9. The degassing apparatus of claim 2, wherein the electrolyte before the cooling has a first viscosity, and the cooling member is configured to cool the electrolyte until the electrolyte attains a second viscosity, the second viscosity being 150% or more of the first viscosity.

10. A method for degassing a pouch, the method comprising the steps of:
    seating a body part of the pouch on a lower mold;
    forcing an upper mold to descend on the pouch to press the body part seated on the lower mold;
    cooling the body part to lower a temperature of an electrolyte in an electrode assembly of the pouch by a cooling member comprising a Peltier element configured to adjust the cooling according to a temperature and a viscosity of the electrolyte, and
    suctioning a gas from the pouch by inserting a gas inhaler into a gas pocket part of the pouch, the gas pocket part extending from the body part.

11. The method of claim 10, wherein the step of cooling is initiated after the step of seating the body part and before the step of forcing the upper mold to descend on the pouch to press the body part.

12. The method of claim 11, wherein the step of suctioning the gas is performed simultaneously with the step of cooling and the step of forcing the upper mold to descend on the pouch to press the body part.

13. The method of claim 12, wherein after the electrolyte is cooled to a temperature less than a predetermined temperature, the step of suctioning the gas is initiated.

14. The method of claim 11, wherein, during the step of cooling, a connection point between the body part and the gas pocket part is more quickly cooled than other points of the pouch.

15. The method of claim 11, wherein the step of cooling includes cooling the electrolyte to a temperature range in which no change in a physical property of the electrolyte occurs.

* * * * *